(12) United States Patent
Lee et al.

(10) Patent No.: US 9,528,559 B2
(45) Date of Patent: Dec. 27, 2016

(54) LATCH ASSEMBLY INCLUDING DIAPHRAGM SPRING AND THRUST BEARING

(71) Applicant: Schaeffler Technologies GmbH & Co. KG, Herzogenaurach (DE)

(72) Inventors: Brian Lee, York, SC (US); Justin Bitar, Charlotte, NC (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 15 days.

(21) Appl. No.: 14/534,388

(22) Filed: Nov. 6, 2014

(65) Prior Publication Data
US 2016/0131202 A1 May 12, 2016

(51) Int. Cl.
*F16D 23/14* (2006.01)
*F16C 19/30* (2006.01)
*F16C 33/58* (2006.01)
*F16D 125/58* (2012.01)

(52) U.S. Cl.
CPC .......... *F16D 23/145* (2013.01); *F16C 19/305* (2013.01); *F16C 33/586* (2013.01); *F16C 33/588* (2013.01); *F16C 2361/43* (2013.01); *F16D 2125/582* (2013.01); *F16D 2250/0084* (2013.01)

(58) Field of Classification Search
CPC ...... F16D 23/14; F16D 23/143; F16D 23/144; F16D 23/145; F16D 23/146; F16D 13/50; F16D 13/22; F16D 13/24; F16D 13/30; F16D 13/32; F16D 13/34; F16D 13/36; F16D 13/44; F16C 2361/43
See application file for complete search history.

(56) References Cited

U.S. PATENT DOCUMENTS

| | | | | |
|---|---|---|---|---|
| 2,117,482 A | * | 5/1938 | Klix | F16D 13/583 192/113.23 |
| 2,630,897 A | * | 3/1953 | Porter | F16D 23/145 192/110 R |
| 2,858,920 A | * | 11/1958 | Doble | F16D 13/30 192/111.1 |
| 4,238,018 A | * | 12/1980 | Maucher | F16D 23/14 192/110 B |
| 4,529,075 A | * | 7/1985 | Renaud | F16D 23/143 192/110 B |
| 4,566,578 A | * | 1/1986 | Leigh-Monstevens | F16C 19/163 192/110 B |

(Continued)

FOREIGN PATENT DOCUMENTS

DE 10 2008 058688 A1 6/2009
DE 102013221841 A1 * 5/2014 ........... F16D 23/143

*Primary Examiner* — Richard Lorence
*Assistant Examiner* — David Morris
(74) *Attorney, Agent, or Firm* — Davidson, Davidson & Kappel, LLC

(57) ABSTRACT

A latch subassembly for a motor vehicle drive train is provided. The latch subassembly includes a bearing arrangement including at least one thrust bearing. The latch subassembly also includes a diaphragm spring. The diaphragm spring includes a first end for axially mounting in a housing and a second end held by the at least one thrust bearing, the second end being axially movable between a first position and a second position within the bearing arrangement. A disconnect assembly and a method of forming a disconnect assembly are also provided.

6 Claims, 5 Drawing Sheets

(56) References Cited

U.S. PATENT DOCUMENTS

| | | | | |
|---|---|---|---|---|
| 4,611,700 A * | 9/1986 | Despres | F16D 23/14 | 192/110 B |
| 4,613,027 A * | 9/1986 | Lassiaz | F16D 23/12 | 192/110 B |
| 4,646,901 A * | 3/1987 | Lassiaz | F16D 23/146 | 192/109 A |
| 4,648,499 A * | 3/1987 | Despres | F16D 23/145 | 192/110 B |
| 4,660,701 A * | 4/1987 | Lassiaz | F16D 23/146 | 192/110 B |
| 4,778,039 A * | 10/1988 | Eliasson | F16D 23/14 | 192/70.13 |
| 4,830,162 A * | 5/1989 | Kuno | F16D 23/14 | 192/110 B |
| 4,903,807 A * | 2/1990 | Kabayama | F16D 23/145 | 192/110 B |
| 4,944,380 A * | 7/1990 | Kitano | F16D 23/145 | 192/89.23 |
| 4,991,703 A * | 2/1991 | Kuno | F16D 23/14 | 192/110 B |
| 5,598,912 A * | 2/1997 | Uenohara | F16D 23/14 | 192/70.13 |
| 9,080,607 B2 * | 7/2015 | Gooden | F16C 33/586 | |
| 2008/0045383 A1 * | 2/2008 | Hornbrook | F16D 13/44 | 477/190 |

* cited by examiner

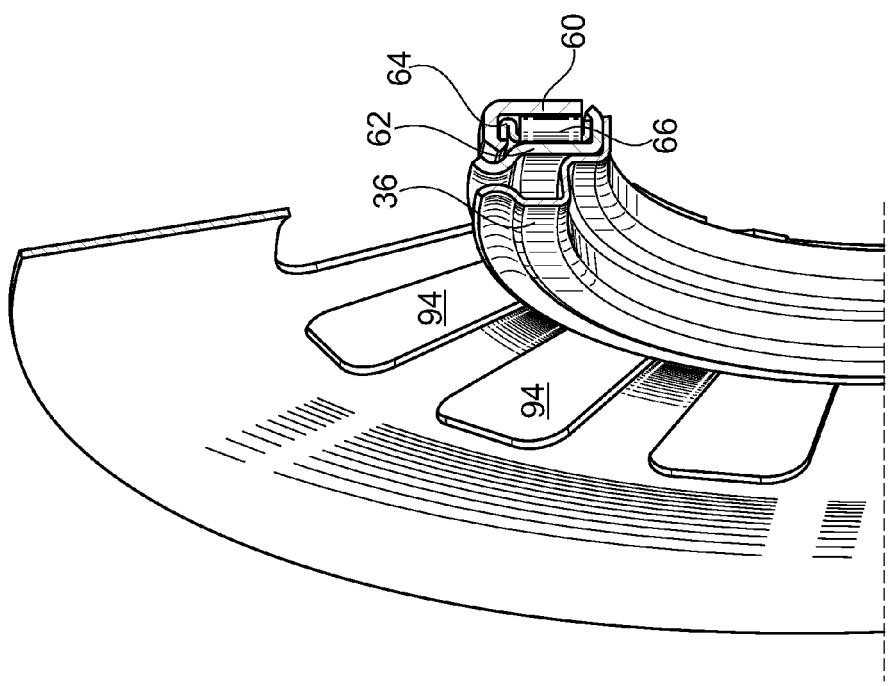
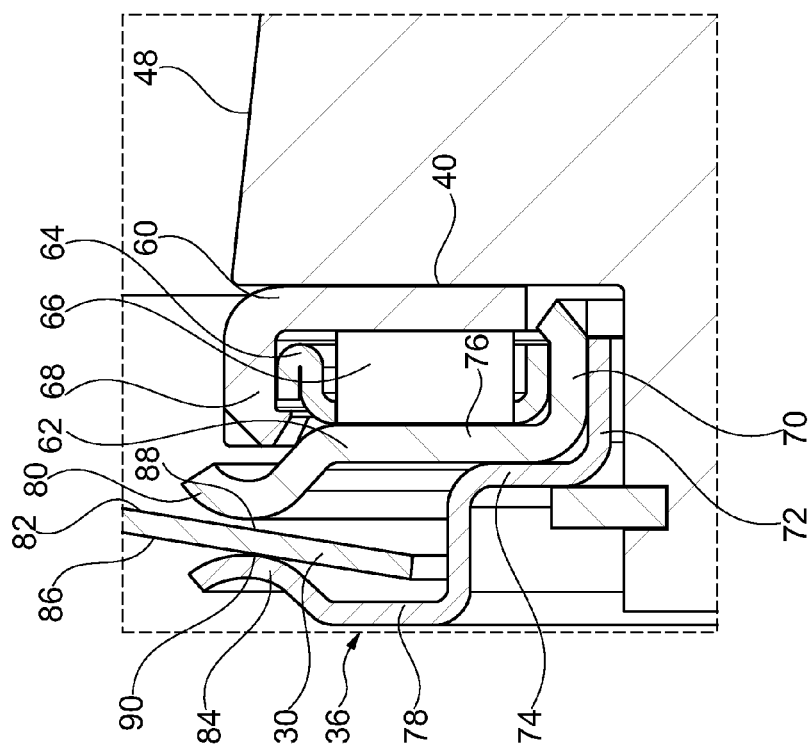
Fig. 2a
Fig. 2b

LATCH ASSEMBLY INCLUDING DIAPHRAGM SPRING AND THRUST BEARING

The present disclosure relates generally to motor vehicle drive trains and more specifically to disconnect assemblies in motor vehicle drive trains.

BACKGROUND

U.S. Pat. No. 4,613,027 discloses a gripping piece for coupling a clutch release bearing to a diaphragm.

SUMMARY OF THE INVENTION

A latch subassembly for a motor vehicle drive train is provided. The latch subassembly includes a bearing arrangement including at least one thrust bearing. The latch subassembly also includes a diaphragm spring. The diaphragm spring includes a first end for axially mounting in a housing and a second end held by the at least one thrust bearing, the second end being axially movable between a first position and a second position within the bearing arrangement.

A disconnect assembly for a motor vehicle drive train is also provided. The disconnect assembly includes a housing, a first shaft within the housing supporting a first clutch part, a second shaft within the housing supporting a second clutch part that is axially movable, and a diaphragm spring including a first end fixed to housing and a second end coupled to the second clutch part. The diaphragm spring is configured to hold the second clutch part in a first position in which the second clutch part engages the first clutch part and a second position in which the second clutch part is spaced away from the first clutch part.

A method of forming a disconnect assembly for a motor vehicle drive train is also provided. The method includes forming a thrust bearing and coupling an end of a diaphragm spring to thrust bearing by sandwiching the end axially between a race of the thrust bearing and a further part.

BRIEF DESCRIPTION OF THE DRAWINGS

The present invention is described below by reference to the following drawings, in which:

FIG. 2a shows an enlarged cross-sectional side view of a portion of the disconnect assembly of the first embodiment;

FIG. 2b shows a cross-sectional perspective view of a latch subassembly of the disconnect assembly of the first embodiment;

DETAILED DESCRIPTION

Figure 1A:
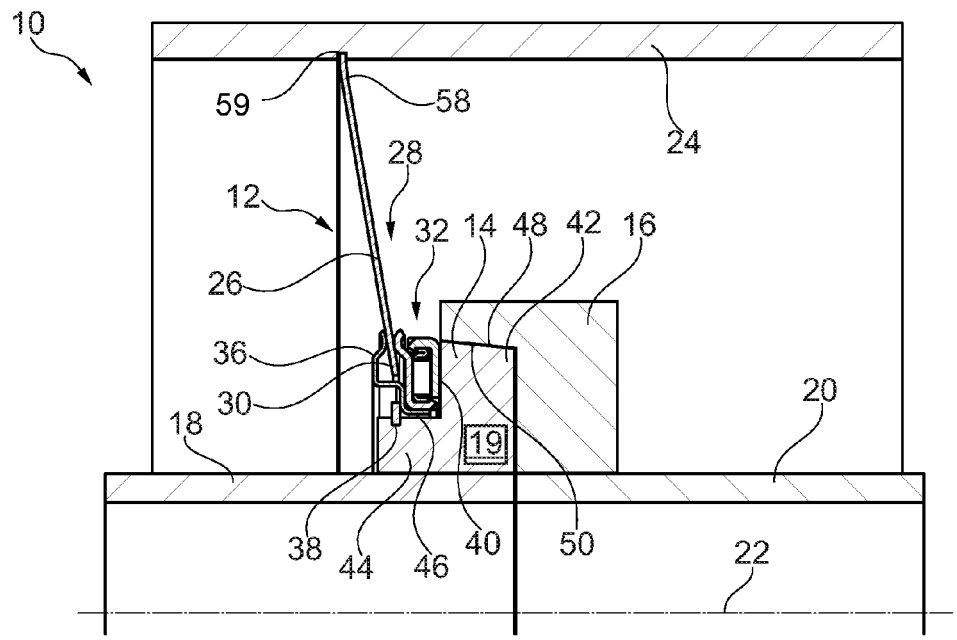
FIG. 1a schematically shows a cross-sectional side view of a disconnect assembly for a motor vehicle drive train in accordance with a first embodiment of the present invention in a connected state.
Figure 1B:
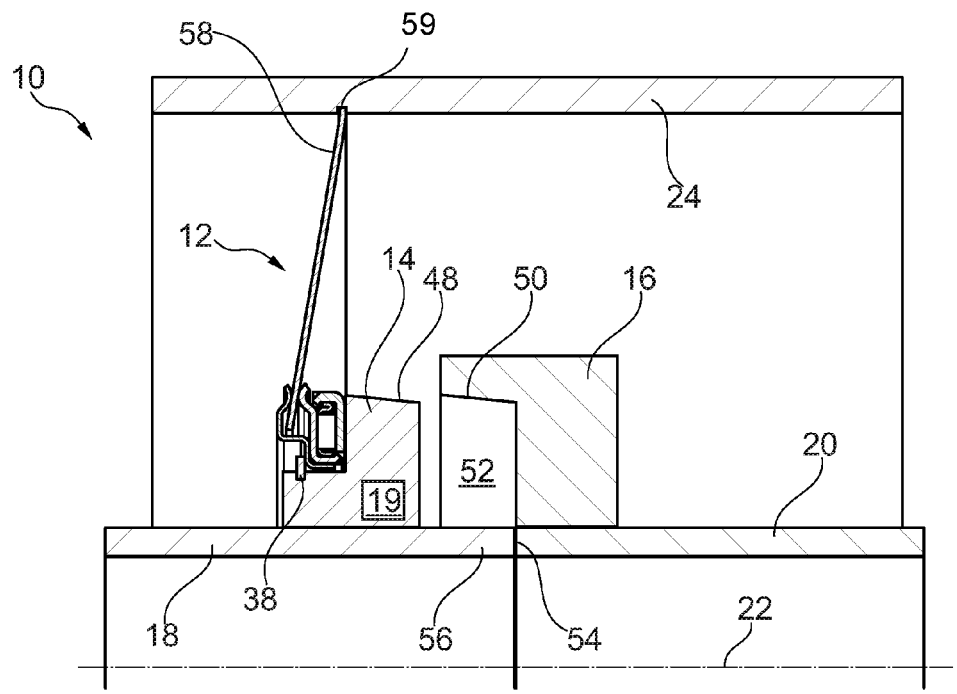
FIG. 1b schematically shows a cross-sectional side view of the disconnect assembly of the first embodiment in a disconnected stated.

FIGS. 1a and 1b schematically show cross-sectional side views of a disconnect assembly 10 for a motor vehicle drive train in accordance with a first embodiment of the present invention. FIG. 1a shows the disconnect assembly 10 in a connected state and FIG. 1b shows the disconnect assembly 10 in a disconnected stated. Disconnect assembly 10 includes a latch subassembly 12 for latching a first clutch part 14 in a first position in which the first clutch part 14 is engaged with a second clutch part 16 (i.e., the connected state) and latching the first clutch part in a second position in which the first clutch part 14 is disengaged from and spaced away from the second clutch part 16 (i.e., the disconnected state). Disconnect assembly 10 may for example be used in an all wheel drive motor vehicle drive train to connect and disconnect the front and rear wheel drive shafts. First clutch part 14 is rotationally fixed to a first rotatable shaft 18 in an axially slidable manner such that first clutch part 14 is axially slidable along an outer circumferential surface of first rotatable shaft 18 between the first position (FIG. 1a) and the second position (FIG. 1b) by an actuator 19, which is shown schematically in FIGS. 1a, 1b. Actuator 19 may be for example an electromagnet actuator or a hydraulic actuator and may be fixed to a housing 24, which this embodiment is stationary. Second clutch part 16 is rotationally and axially fixed to a second rotatable shaft 20 at an axial end of second rotatable shaft 20 facing first rotatable shaft 18. Both shafts 18, 20 are rotatable about a common center axis 22. In an alternative embodiment, housing 24 may not be stationary, but instead is rotatable at a different velocity that shaft 18.

Latch subassembly 12 includes a diaphragm spring 26 and a bearing arrangement 28 holding a radially inner end 30 of diaphragm spring 26. In this embodiment, bearing arrangement 28 includes a thrust bearing 32 and a further part, in the form of a ring formed by a washer 36. Bearing arrangement 28 is discussed in further detail below with respect to FIGS. 2a to 2c.

A snap ring 38 holds bearing arrangement 28 in place on an outer circumferential surface of first clutch part 14 such that bearing arrangement 28 is held axially between snap ring 38 and an axial abutment surface 40 of first clutch part 14. First clutch part 14 is substantially L-shaped when viewed in cross-section, as shown in FIGS. 1a and 1b, and includes a radially extending section 42 and an axially extending section 44. The outer circumferential surface of axially extending section 44 forms a support surface 46 for radially supporting bearing arrangement 28, specifically via washer 36. Radially extending section 42 includes abutment surface 40, which is formed by a radially extending surface that acts as a thrust surface for thrust bearing 32. The outer circumferential surface of radially extending section 42 is angled with respect to center axis 22 to form a first wedge surface 48 for engaging a second wedge surface 50 of clutch part 16. When wedge surfaces 48, 50 are in engagement, as shown in FIG. 1a when clutch part 14 is in the first position, shafts 18, 20 are rotationally fixed together and thus rotate together at the same speed about center axis 22. When wedge surfaces 48, 50 are disengaged from each other, as shown in FIG. 1b when clutch part 14 is in the second position, shafts 18, 20 are rotationally disengaged from each other and thus may rotate at different speeds about center axis 22. Second wedge surface 50 is formed on an surface of a blind hole 52 formed in second clutch part 16. Second wedge surface 50 is also angled with respect to center axis 22 and matches the shape of wedge surface 48 for mating clutch parts 14, 16 during the connected state. Second wedge surface 50 extends axially past an axial edge 54 of shaft 20 that faces shaft 18 and surrounds an axial end 56 of shaft 18 that faces shaft 20.

Disconnect assembly 10 further includes housing 24, which surrounds latch subassembly 12, clutch parts 14, 16 and shaft 18, 20. A radially outer end 58 of diaphragm spring 26 extends into an annular groove 59 formed in an inner circumferential surface of housing 24, axially fixing outer end 58 of diaphragm spring 26 to housing 24. Diaphragm spring 26 is conical in shape and is configured to include an inversion point that allows diaphragm spring 26 to both push and pull the bearing arrangement 28. In other words, diaphragm spring 26 exhibits "over-center" behavior and partial-to-full force reversal characteristics. When diaphragm spring 26 passes through its inversion point, diaphragm spring 26 snaps from a positive to a negative force (i.e., from pushing to pulling) or from a negative to a positive force (i.e., from pulling to pushing). Thus, when actuator 19 moves first clutch part 14 between the first position (FIG. 1a) and the second position (FIG. 1b), diaphragm spring 26 passes through its inversion point and snaps from pushing to pulling or snaps from pulling to pushing. Embodiments of the invention are not limited to a particular force arrangement of diaphragm spring 26 with respect to housing 24. In other words, diaphragm spring 26 may be arranged and configured such that diaphragm spring 26 pushes clutch part 14 when in the first position and pulls clutch part when in the second position or, alternatively, such that diaphragm spring 26 pulls clutch part 14 when in the first position and pushes clutch part when in the second position.

Diaphragm spring 26, due to its mounting in housing 24 does not rotate with shaft 18 or rotates at a different velocity that shaft 18. Diaphragm spring 26 applies the push/pull force on rotating clutch part 14 and thus is isolated via thrust bearing 32, which is both pushed and pulled by diaphragm spring 26. Diaphragm spring 26 may advantageously allow latch subassembly 12 to hold its position in connect and disconnect states without the need for constant power supply or complicated latching mechanisms.

Figure 2C:
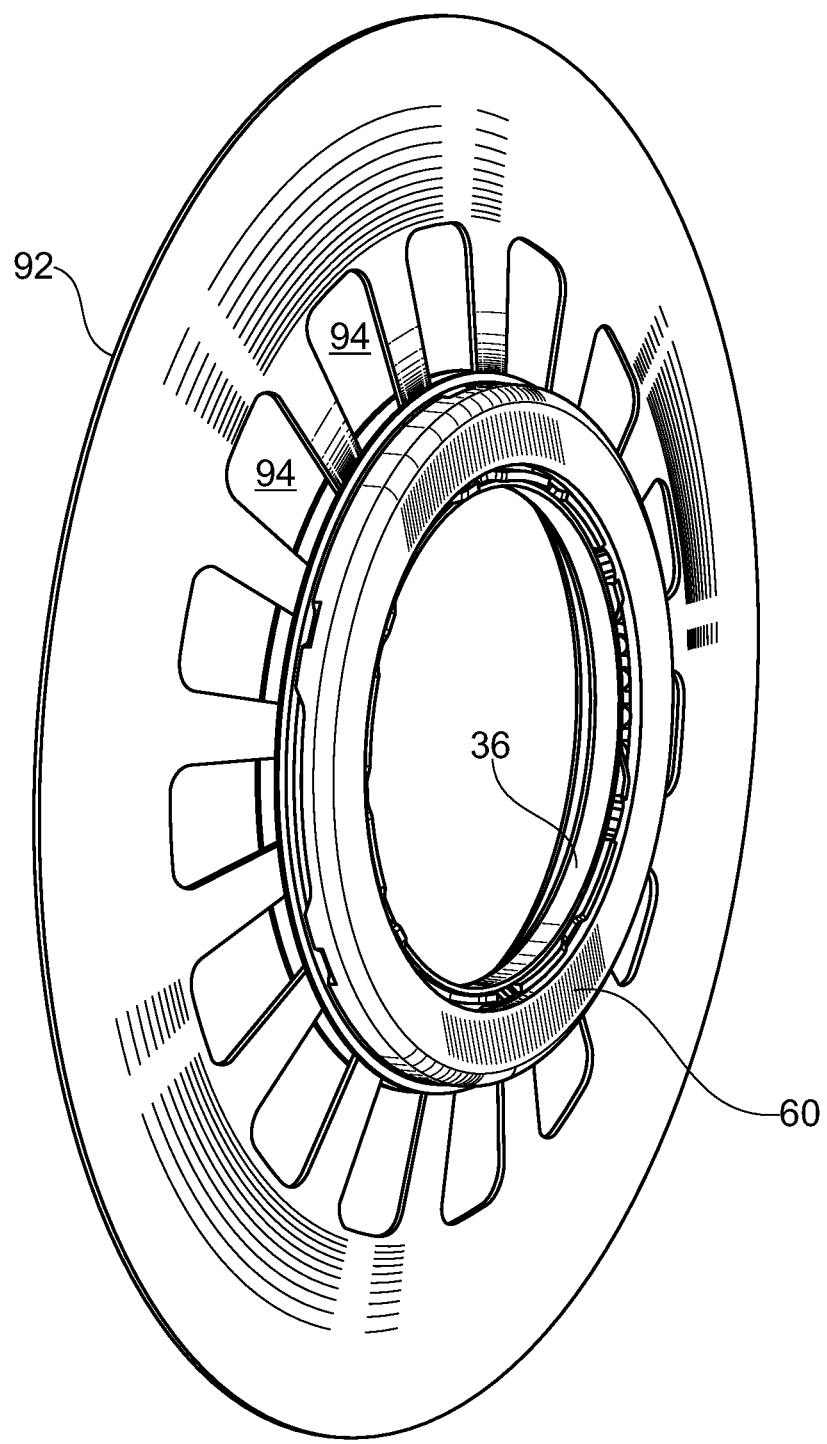
FIG. 2c shows a perspective view of the latch subassembly of the disconnect assembly of the first embodiment.

FIGS. 2a to 2c show latch subassembly 12 in more detail. FIG. 2a shows an enlarged cross-sectional side view of a portion of disconnect assembly 10, FIG. 2b shows a cross-sectional perspective view of latch subassembly 12, and FIG. 2c shows a perspective view of latch subassembly 12. Thrust bearing 32 includes a first race ring 60 for contacting abutment surface 40 of clutch part 14, a second race ring 62 axially opposite of first race ring 60 and a roller cage 64 supporting roller elements 66, which in this embodiment are needle rollers, axially between race rings 60, 62. First race ring 60 includes an axially extending collar 68 axially overlapping cage 64 and forming a radially outer surface of thrust bearing 32. Second race ring 62 includes an axially extending collar 70 axially overlapping cage 64 and forming a radially inner surface of thrust bearing 32.

Washer 36 is held snugly against second race ring 62 such that washer 36 and second race ring 62 delimit a spring receiving space therebetween for receiving radially inner end 30 of diaphragm spring 26. In this embodiment, washer 36 includes an axially extending collar 72 contacting a radially inner surface of collar 70 of second race ring 62, a radially extending section 74 protruding radially outward from collar 72 and contacting a radially extending section 76 of second race ring 62 and a spring receiving section 78 for delimiting the spring receiving space with second race ring 62 and receiving inner end 30 of diaphragm spring 26. Second race ring 62 includes a spring holding section 80 for contacting a first axial surface 82 of diaphragm spring 26 and washer 36 further includes a spring holding section 84 radially outside of spring receiving section 78 for contacting a second axial surface 86 of diaphragm spring 26 that is opposite of first axial surface 82. Spring holding sections 80, 84 include respective contact faces 88, 90 for contacting diaphragm spring 26 from opposite sides to hold radially inner end 30 of diaphragm spring 26 such that bearing arrangement 28 and clutch part 14 are latched in place by diaphragm spring 26 in the connected state and the disconnected state. As diaphragm spring 26 actuates back and forth in the direction of axis 22, radially inner end 30 pivots about faces 88, 90, which in this embodiment are formed by curved surfaces.

As shown in FIGS. 2b and 2c, diaphragm spring 26 includes a continuous circumferentially extending outer surface 92 and a plurality of radially extending slots 94 formed at the inner circumference of diaphragm spring 26.

Figure 3A:
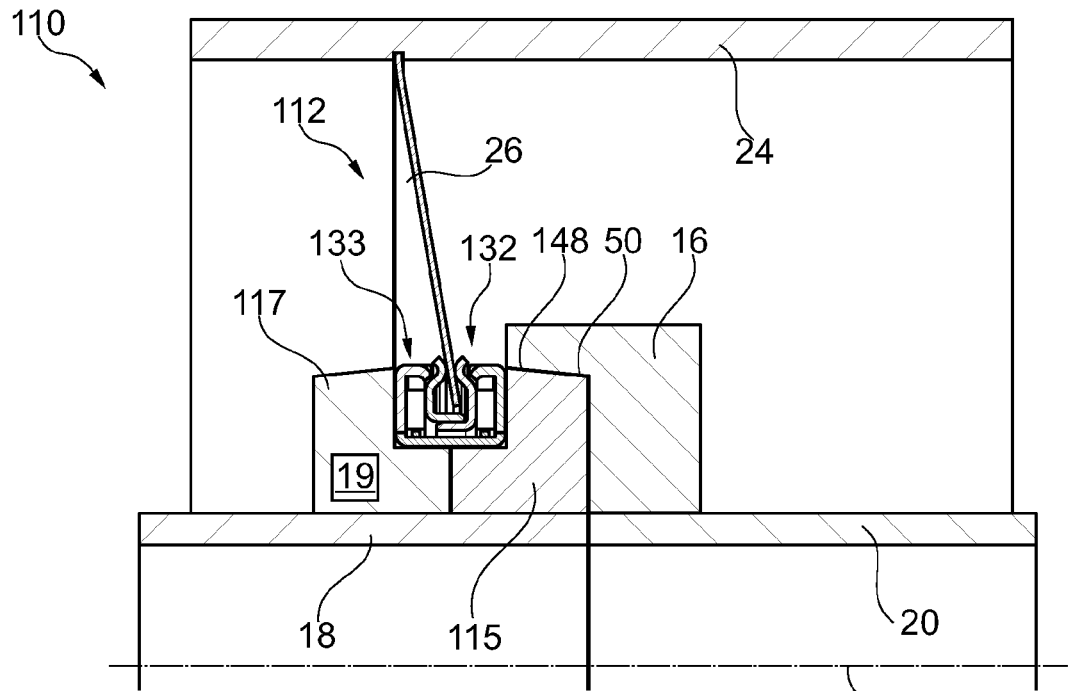
FIG. 3a schematically shows a cross-sectional side view of a disconnect assembly for a motor vehicle drive train in accordance with a second embodiment of the present invention in a connected state.
Figure 3B:
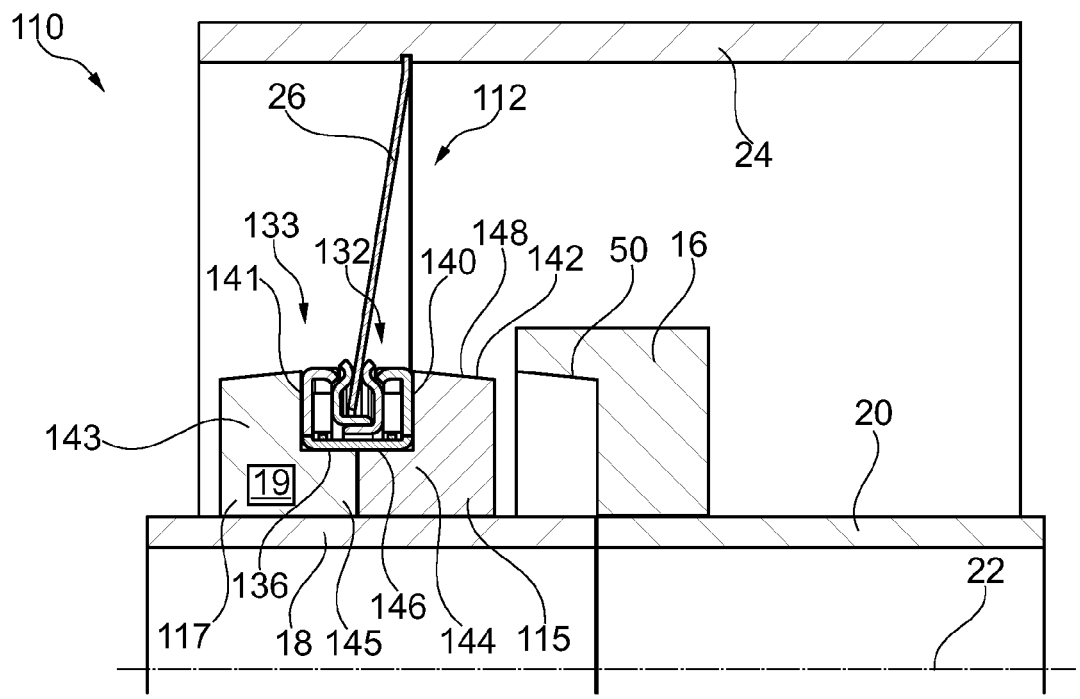
FIG. 3b schematically shows a cross-sectional side view of the disconnect assembly of the second embodiment in a disconnected stated.

FIGS. 3a and 3b schematically show cross-sectional side views of a disconnect assembly 110 for a motor vehicle drive train in accordance with a second embodiment of the present invention. FIG. 3a shows the disconnect assembly 110 in a connected state and FIG. 3b shows the disconnect assembly 110 in a disconnected stated. Disconnect assembly 110 is formed in substantially the same manner as disconnect assembly 10, except that a bearing arrangement 128 in the second embodiment is formed differently than bearing arrangement 28 and a first clutch part 114 in the second embodiment is formed differently than first clutch part 14. Accordingly, disconnect assembly 110 includes a different latch subassembly 112 for latching a first clutch part 114 in a first position in which the first clutch part 114 is engaged with second clutch part 16 (i.e., the connected state) and latching the first clutch part in a second position in which the first clutch part 114 is disengaged from and spaced away from the second clutch part 16 (i.e., the disconnected state). First clutch part 114 is rotationally fixed to first rotatable shaft 18 in an axially slidable manner such that first clutch part 14 is axially slidable along an outer circumferential surface of first rotatable shaft 18 by actuator 19. Latch subassembly 112 includes diaphragm spring 26 and bearing arrangement 128, which holds radially inner end 30 of diaphragm spring 26.

In this embodiment, bearing arrangement 128 includes two thrust bearings 132, 133 and first clutch part 114 includes two sections 115, 117. Section 115, which engages second clutch part 16, is formed in substantially the same as first clutch part 14 described above and includes a wedge surface 148 for engaging wedge surface 50 of clutch part 16. Section 117 is a mirror image of section 115 and is fixed to section 115 such that sections 115, 117 are axially movable together on shaft 18 via diaphragm spring 26. The provisions of additional thrust bearing 133 and additional section 117 allow diaphragm spring 26 to hold clutch part 116 in both the first position (i.e., the connected stated shown in FIG. 3a) and the second position (i.e., the disconnected state shown in FIG. 3b) while shaft 18 is rotating.

Bearing arrangement 128 is held axially between an axial abutment surface 140 of section 115 and an axial abutment surface 141 of section 117. Clutch section 115 includes a radially extending section 142 and an axially extending section 144 and clutch section 117 similarly includes a radially extending section 143 and an axially extending section 145. The outer circumferential surfaces of axially extending sections 144, 145 form a support surface 146 for radially supporting bearing arrangement 28, specifically via a bearing bore race 136. Radially extending sections 142, 143 includes abutment surfaces 140, 141, respectively, which are formed by radially extending surfaces that act as thrust surfaces for thrust bearings 32, 33, respectively. When wedge surfaces 148, 50 are in engagement, shafts 18, 20 are rotationally fixed together and thus rotate together at the same speed about center axis 22.

Figure 4:
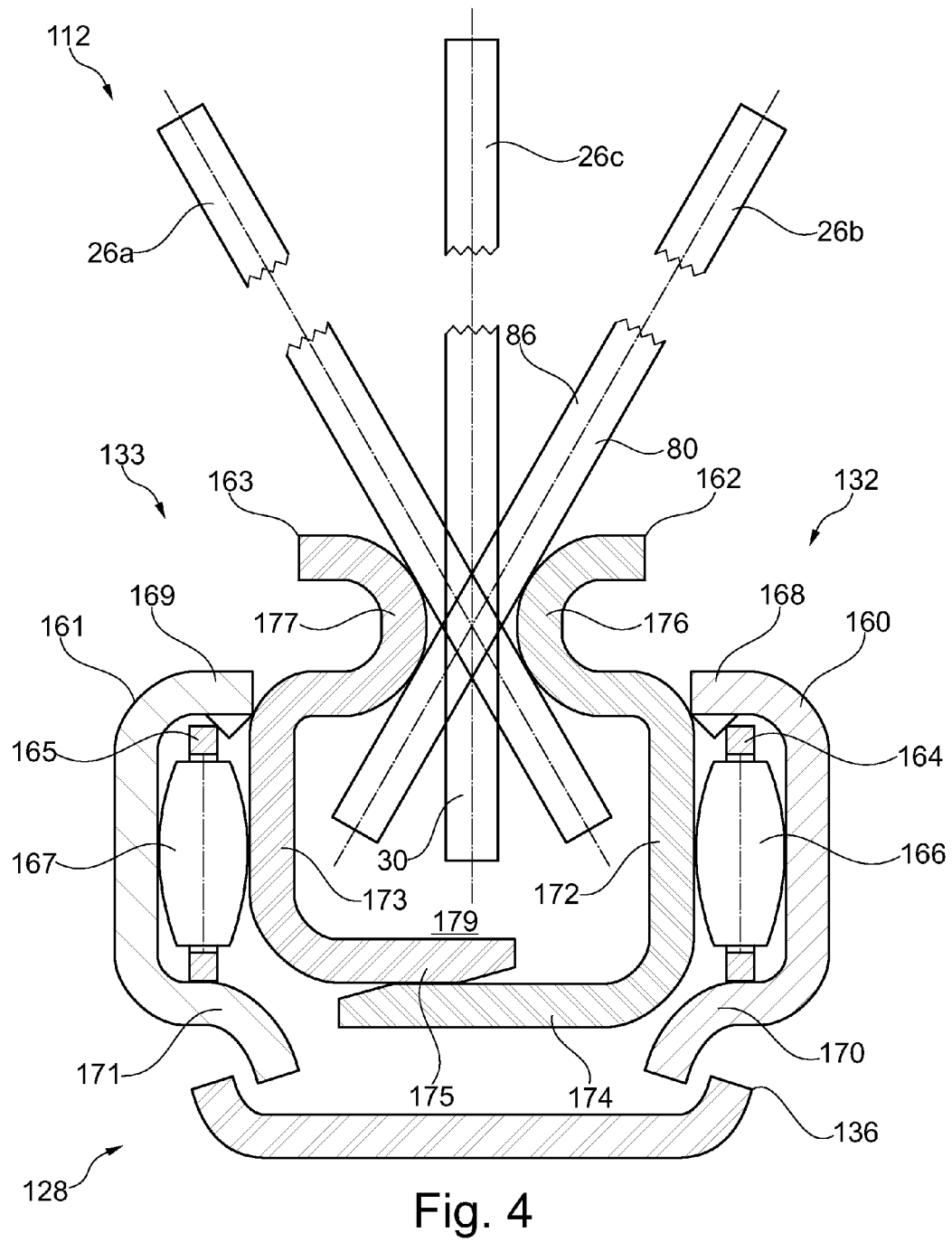
FIG. 4 shows an enlarged cross-sectional side view of a portion of a latch subassembly of the disconnect assembly of the second embodiment.

FIG. 4 shows an enlarged cross-sectional side view of latch subassembly 112. Thrust bearing 132 includes a first race ring 160 for contacting abutment surface 140 of clutch part section 115, a second race ring 162 axially opposite of first race ring 160 and a roller cage 164 supporting roller elements 166, which in this embodiment are needle rollers, axially between race rings 160, 162. First race ring 160 includes an axially extending outer collar 168 axially overlapping cage 164 and forming a radially outer surface of thrust bearing 132. First race ring 160 further includes an axially extending inner collar 170 axially overlapping cage 164 and forming a radially inner surface of thrust bearing 132. Thrust bearing 133 includes a third race ring 161 for contacting abutment surface 141 of clutch part section 117, a fourth race ring 163 axially opposite of first race ring 161 and roller cage 165 supporting roller elements 167, which in this embodiment are needle rollers, axially between race rings 161, 163. Third race ring 161 includes an axially extending outer collar 169 axially overlapping cage 165 and forming a radially outer surface of thrust bearing 133. Third race ring 161 further includes an axially extending inner collar 171 axially overlapping cage 165 and forming a radially inner surface of thrust bearing 133.

Second race ring 162 and fourth race ring 163 delimit a spring receiving space 179 therebetween for receiving radially inner end 30 of diaphragm spring 26. Second race ring 162 includes a radially extending section 172 having a first axial surface for contacting roller elements 166, an axially extending section 174 extending axially from a radially inner end of radially extending section 172 and a spring holding section 176 extending from a radially outer end of radially extending section 172 for contacting first axial surface 82 of diaphragm spring 26. Fourth race ring 163 includes a radially extending section 173 having a first axial surface for contacting roller elements 167, an axially extending section 175 extending axially from a radially inner end of radially extending section 173 and a spring holding section 177 extending from a radially outer end of radially extending section 173 for contacting second axial surface 86 of diaphragm spring 26. Accordingly, spring receiving space is formed axially between radially extending sections 172, 173, and is also formed radially between axially extending sections 174, 175 and spring holding sections 176, 177. Spring holding sections 176, 177 includes respective contact faces 188, 190 for contacting diaphragm spring 26 from opposite sides to hold radially inner end 30 of diaphragm spring 26 such that bearing arrangement 128 and clutch part 114 are latched in place by diaphragm spring 26 in the connected state and the disconnected state.

In FIG. 4, three positions of diaphragm spring 26 are shown, including a first position 26a in which diaphragm spring 26 is holding clutch part 114 in engagement with clutch part 116 (FIGS. 3a and 3b) and thrust bearing 132 is utilized by second race ring 162 being forced against roller elements 166 by diaphragm spring 26, a second position 26b in which diaphragm spring 26 is holding clutch part 114 away from clutch part 116 (FIGS. 3a and 3b) and thrust bearing 133 is utilized by fourth race ring 163 being forced against roller elements 167 by diaphragm spring 26, and a third intermediate position 26c in which diaphragm spring 26 is between the first and second positions 26a, 26b. In the first position 26a, diaphragm spring 26 applies an axial force to bearing arrangement 128, specifically at contact face 188 of spring holding section 176, to force clutch part 114 into clutch part 116. In the second position 26b, diaphragm spring 26 applies an axial force to bearing arrangement 128, specifically at contact face 190 of spring holding section 177, to hold clutch part 114 away from clutch part 116. As the radially inner end 30 of diaphragm spring 26 actuates back and forth in the direction of axis 22 between the first and second positions 26a, 26b, radially inner end 30 pivots about faces 188, 190, which in this embodiment are formed by curved surfaces.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A latch subassembly for a motor vehicle drive train comprising:
   a bearing arrangement including a first thrust bearing and a ring; and
   a diaphragm spring, the diaphragm spring including a first end for axially mounting in a housing and a second end held by the first thrust bearing and the ring, the second end being axially movable between a first position and a second position within the bearing arrangement,
   wherein the first thrust bearing includes a first race ring forming a thrust surface for contacting a first axial surface of an axially movable clutch part, the first thrust bearing including a second race ring for contacting the second end of the diaphragm spring, the first thrust bearing including rollers axially between the first and second race rings,
   wherein the bearing arrangement includes a second thrust bearing, the second thrust bearing including a third race ring forming a second thrust surface for contacting a second axial surface of the axially movable clutch part, the second thrust bearing including the ring in the form of a fourth race ring for contacting the second end of the diaphragm spring, the second thrust bearing including rollers axially between the third and fourth race rings.

2. A disconnect assembly for a motor vehicle drive train comprising:
   a housing;
   a first shaft within the housing supporting a first clutch part;
   a second shaft within the housing supporting a second clutch part, the second clutch part being axially movable;
   a diaphragm spring including a first end fixed to housing and a second end coupled to the second clutch part, the diaphragm spring configured to hold the second clutch part in a first position in which the second clutch part engages the first clutch part and a second position in which the second clutch part is spaced away from the first clutch part; and
   at least one thrust bearing coupling the diaphragm spring to the second clutch part, the at least one thrust bearing including a first ring for contacting a first axial surface of the diaphragm spring and a second ring for contacting a second axial surface of the diaphragm spring, wherein the first ring includes a first contact face and the second ring includes a second contact face facing the first contact face, the second end of the diaphragm spring pivoting about the first and second contact faces while moving between the first and second positions, wherein the first and second rings define a sliding space axially therebetween radially inside of the first and second contact faces, an inner radial edge of the diaphragm spring moving axially within the sliding space as the second end of the diaphragm spring pivots about the first and second contact face, wherein the at least one thrust bearing includes a first thrust bearing and a second thrust bearing, the first thrust bearing including the first ring and the second thrust bearing including the second ring.

3. The disconnect assembly as recited in claim 2 wherein the first ring forms a first inner race of the first thrust bearing and the second ring forms a second inner race of the second thrust bearing.

4. A method of constructing a disconnect assembly for a motor vehicle drive train comprising:

forming a first thrust bearing;

coupling an end of a diaphragm spring to the first thrust bearing by sandwiching the end axially between a race of the first thrust bearing and a further part;

fixing another end of the diaphragm spring to a housing such that the diaphragm spring is configured to hold the first thrust bearing in a first axial position and a second axial position; and fixing the first thrust bearing to an axially movable clutch part, wherein the further part is a race of a second thrust bearing.

5. The method as recited in claim 4 wherein the race of the first thrust bearing includes a first contact face and the further part includes a second contact face facing the first contact face, the second end of the diaphragm spring pivoting about the first and second contact faces while moving between the first and second axial positions.

6. The method as recited in claim 5 wherein the race of the first thrust bearing and the further part define a sliding space axially therebetween, an inner radial edge of the diaphragm spring moving axially within the sliding space as the second end of the diaphragm spring pivots between the first and second axial positions.

* * * * *